United States Patent
Ma (10) Patent No.: US 11,264,824 B2
(45) Date of Patent: Mar. 1, 2022

(54) METHOD OF IMPROVING WIRELESS CHARGING EFFICIENCY, ELECTRONIC DEVICE AND STORAGE MEDIUM

(71) Applicant: BEIJING XIAOMI MOBILE SOFTWARE CO., LTD., Beijing (CN)

(72) Inventor: Qiang Ma, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 207 days.

(21) Appl. No.: 16/679,135

(22) Filed: Nov. 8, 2019

(65) Prior Publication Data

US 2020/0313454 A1  Oct. 1, 2020

(30) Foreign Application Priority Data

Mar. 27, 2019  (CN) .......................... 201910237992.2

(51) Int. Cl.
*H02J 50/12*  (2016.01)
*H02J 7/02*  (2016.01)

(52) U.S. Cl.
CPC .............. *H02J 7/025* (2013.01); *H02J 50/12* (2016.02)

(58) Field of Classification Search
CPC .................................. H02J 7/025; H02J 50/12
See application file for complete search history.

(56) References Cited

U.S. PATENT DOCUMENTS

| 2015/0115878 A1* | 4/2015 | Park | H02J 50/12 320/108 |
|---|---|---|---|
| 2016/0248275 A1 | 8/2016 | Okidan | |
| 2017/0288446 A1* | 10/2017 | Elkhouly | H02J 50/402 |
| 2017/0310145 A1* | 10/2017 | Crosby, II | H02J 7/025 |
| 2017/0346343 A1* | 11/2017 | Atasoy | H01F 38/14 |

FOREIGN PATENT DOCUMENTS

| CN | 104659930 A | 5/2015 |
|---|---|---|
| CN | 107749673 A | 3/2018 |
| CN | 109494888 A | 3/2019 |

OTHER PUBLICATIONS

Extended European Search Report issued to EP Application No. 19212715.7 dated Feb. 19, 2020, (10p).
European Patent Office, Office Action Issued in Application No. 19212715.7, dated Aug. 4, 2021, Germany, 6 pages.

* cited by examiner

*Primary Examiner* — Nghia M Doan
(74) *Attorney, Agent, or Firm* — Arch & Lake LLP (57) ABSTRACT

A method, an electronic device and a storage medium are provided for improving a wireless charging efficiency. The method includes: a current capacitance value of a resonant capacitor in a receiver of the electronic device is adjusted to a target capacitance value, where a wireless charging efficiency corresponding to the target capacitance value is superior to a wireless charging efficiency corresponding to the current capacitance value.

14 Claims, 6 Drawing Sheets

Adjust a current capacitance value of a resonant capacitor in a receiving module of an electronic device to a target capacitance value, where a wireless charging efficiency corresponding to the target capacitance value is superior to a wireless charging efficiency corresponding to the current capacitance value — 501

FIG. 5

Determine an open circuit inductance value of a receiving coil in a receiver, where the open circuit inductance value refers to an inductance value corresponding to the receiving coil in the receiver when a transmitting coil in a transmitter opens — 601

Obtain an actual working frequency of the transmitter — 602

Determine a target capacitance value of a resonant capacitor according to the actual working frequency and the open circuit inductance value — 603

FIG. 6

Control a transmitting coil of a transmitter to open within a specified time period, when it is detected that the transmitter is placed on a receiver — 701

Control a power management integrated circuit of an electronic device to perform reverse excitation for a receiving coil of the receiver so that damping oscillation signals are generated on the receiving coil — 702

Determine an open circuit inductance value of the receiving coil according to two designated amplitudes of the damping oscillation signals on the receiving coil and a time interval between the two designated amplitudes — 703

METHOD OF IMPROVING WIRELESS CHARGING EFFICIENCY, ELECTRONIC DEVICE AND STORAGE MEDIUM

CROSS REFERENCE TO RELATED APPLICATIONS

This application claims priority to Chinese Patent Application No. 201910237992.2 filed on Mar. 27, 2019, the entire content of which is incorporated herein by reference.

TECHNICAL FIELD

The present disclosure relates to the field of wireless charging technology, and in particular to a method of improving a wireless charging efficiency, an electronic device and a storage medium.

BACKGROUND

At present, in a wireless charging solution of Qi protocol (a wireless charging protocol stipulated by Wireless Power Consortium (WPC)), it is stipulated that a capacitance value of a resonant capacitor in a receiver of an electronic device is a fixed value, i.e. 400 nF or 500 nF in a case of a resonant frequency of 100 kHz.

However, because a transmitter of a wireless charging device adjusts an actual working frequency (for example, 110 kHz~148 kHz) according to its output voltage, a resonant frequency of the receiver is not matched with the actual working frequency of the transmitter. In this case, the resonant capacitor of the receiver does not work at an optimal charging efficiency.

SUMMARY

The present disclosure provides a method of improving a wireless charging efficiency, an electronic device and a storage medium to solve shortages of the related art.

According to a first aspect of the present disclosure, a method of improving a wireless charging efficiency is provided. The method may be applicable to an electronic device having a wireless charging function. The method includes: adjusting a current capacitance value of a resonant capacitor of a receiver in the electronic device to a target capacitance value, where a wireless charging efficiency corresponding to the target capacitance value is superior to a wireless charging efficiency corresponding to the current capacitance value.

According to a second aspect of the present disclosure, an electronic device is provided. The electronic device includes a receiver used for wireless charge where a resonant capacitor is disposed in the receiver and a receiving coil is disposed in the receiver and connected with the resonant capacitor; one or more processors connected with the resonant capacitor; and a memory storing executable instructions. When reading the executable instructions from the memory, the processors are configured to adjust a current capacitance value of the resonant capacitor to a target capacitance value, where a wireless charging efficiency corresponding to the target capacitance value is superior to a wireless charging efficiency corresponding to the current capacitance value.

According to a third aspect of the present disclosure, a machine readable storage medium storing machine executable instructions is provided. The instructions are executed by a processor to perform the following operations: adjusting a current capacitance value of a resonant capacitor of a receiver of an electronic device to a target capacitance value, where a wireless charging efficiency corresponding to the target capacitance value is superior to a wireless charging efficiency corresponding to the current capacitance value.

It is understood that the above general descriptions and subsequent detailed descriptions are merely illustrative and explanatory and shall not be intended to limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

Figure 1:
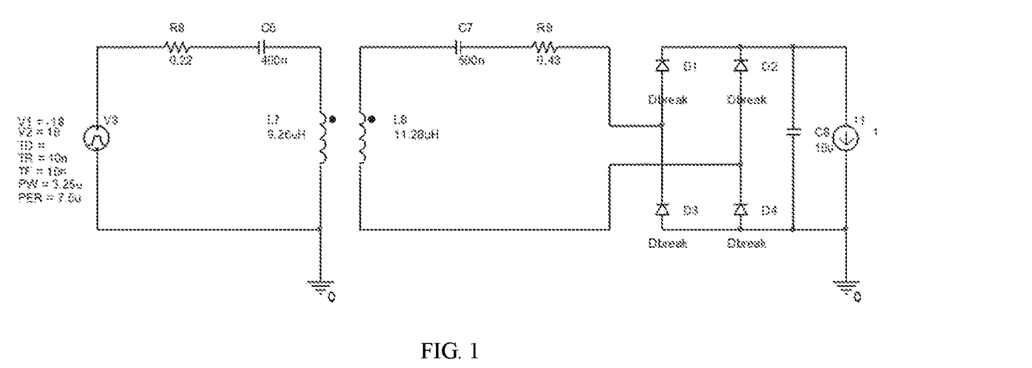
FIG. 1 is a wireless charging circuit in related art.

At present, in a wireless charging solution of Qi protocol (a wireless charging protocol stipulated by wireless power consortium), it is stipulated that a capacitance value of a resonant capacitor in a receiver of an electronic device is a fixed value, i.e. 400 nF or 500 nF in a case of a resonant frequency of 100 kHz. FIG. 1 is a wireless charging circuit in related art. As shown in FIG. 1, coil L7 is a transmitting coil in a transmitter of a wireless charging device, capacitor C6 is a transmitting capacitor in the transmitter, coil L8 is a receiving coil in the receiver, capacitor C7 is a resonant capacitor in the receiver, where the capacitor C7 is of fixed value, for example, 400 nF or 500 nF.

However, because the transmitter adjusts an actual working frequency (for example, 110 kHz~148 kHz) according to its output voltage, a resonant frequency of the receiver is not matched with the actual working frequency of the transmitter. In this case, the resonant capacitor of the receiver does not work at an optimal charging efficiency. Further, if positions that the transmitting coil in the transmitter is placed on the receiving coil in the receiver are different, an inductance value of the receiving coil in the receiver is changed. In this case, the resonant frequency of the receiver is not matched with the working frequency of the transmitter, further reducing wireless charging efficiency.

Figure 2:
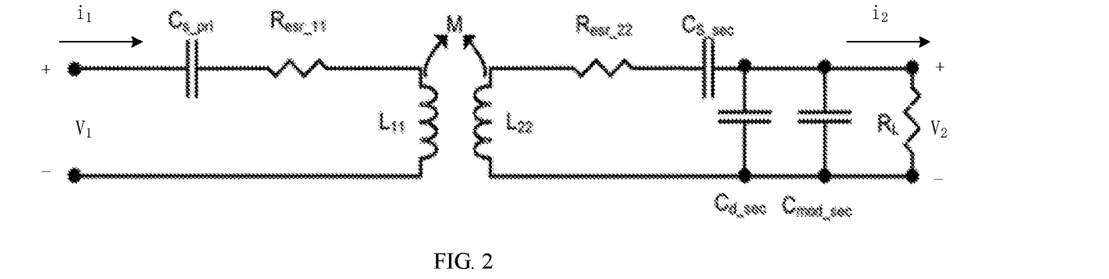
FIG. 2 illustrates a model of a wireless charging circuit according to an example of the present disclosure.

To overcome the above problem, the examples of the present disclosure provide a wireless charging circuit. FIG. 2 is a model of a wireless charging circuit according to an example of the present disclosure. As shown in FIG. 2, the transmitter includes a transmitting capacitor $C_{s\_pri}$, an equivalent resistor $R_{esr\_11}$ and a transmitting coil $L_{11}$. The receiver includes a resonant capacitor $C_{s\_sec}$, an equivalent resistor $R_{esr\_22}$, and a receiving coil $L_{22}$. The receiver further includes a load $R_L$ of the electronic device. A mutual inductance between the transmitting coil $L_{11}$ and the receiving coil $L_{22}$ is $M = k\sqrt{L_{11} \cdot L_{22}}$. Based on the above model, the wireless charging efficiency of the wireless charging circuit is calculated as follows:

$$\eta(f, k, R_L) = \dfrac{(2 \cdot \pi \cdot f \cdot k \cdot \sqrt{L_{11} \cdot L_{22}})^2 \cdot R_L}{R_{ser\_11} + \dfrac{(2 \cdot \pi \cdot f \cdot k \cdot \sqrt{L_{11} \cdot L_{22}})^2 \cdot (R_L + R_{ser\_22})}{(R_L + R_{ser\_22})^2 + \left(2 \cdot \pi \cdot f \cdot L_{22} - \dfrac{1}{2 \cdot \pi \cdot f \cdot C_{s\_sec}}\right)^2}} \quad (1)$$

Based on the formula, it is deduced that, in a case of $$f = \dfrac{1}{2\pi\sqrt{L_{22} C_{s\_sec}}}, \quad (2)$$

the wireless charging efficiency is the highest. $C_{s\_sec}$ is a capacitance value of the resonant capacitor in the receiver; $L_{22}$ is an inductance value of the receiving coil; $L_{11}$ is an inductance value of the transmitting coil; k is a coupling coefficient of the transmitting coil and the receiving coil; f is a working frequency of the transmitting coil; $R_L$ is a load resistance value of the electronic device, and $R_{ser\_22}$ is an equivalent resistance value of the transmitter.

In an example of the present disclosure, in combination with the above formula (2), the resonant capacitor of the receiver is configured as an adjustable capacitor. In this case, the wireless charging efficiency of the receiver may be adjusted by adjusting the capacitance value of the resonant capacitor in the receiver.

Figure 3:
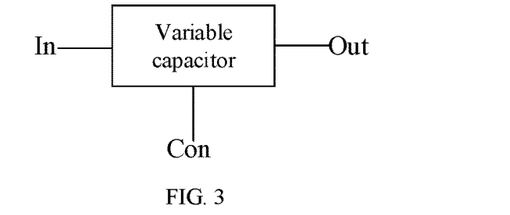
FIG. 3 is a schematic diagram illustrating a variable capacitor according to an example of the present disclosure.

In an example, the resonant capacitor in the receiver may be a variable capacitor, which is a capacitor whose capacitance may be intentionally and repeatedly changed mechanically or electronically. As shown in FIG. 3, the variable capacitor includes an input end In, an output end Out, and a control end Con. In combination with FIGS. 2 and 3, the input end In of the variable capacitor is connected with the equivalent resistor $R_{esr\_22}$, and the output end Out is connected with the load $R_L$ of the electronic device. The control end Con is connected with a processor of the electronic device, or coupled with a controller of a wireless charging device. After determining a target capacitance value of the resonant capacitor, the processor or the controller may input a target voltage corresponding to the target capacitance value to the control end Con of the variable capacitor so that the capacitance value of the variable capacitor changes to the target capacitance value.

Figure 4:
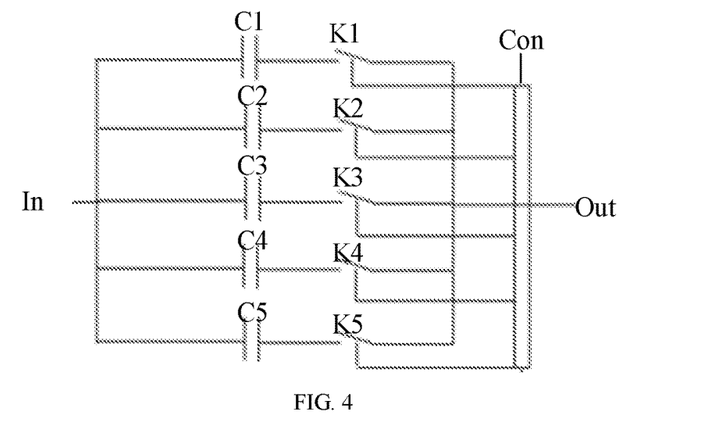
FIG. 4 is a schematic diagram illustrating a resonant capacitor formed by connecting a plurality of capacitor branches in parallel according to an example of the present disclosure.

In another example, the resonant capacitor in the receiver includes a plurality of capacitor branches connected in parallel. The number of the capacitor branches may be set according to the specific application scenario. As shown in FIG. 4, each capacitor branch includes one capacitor C and one controllable switch K connected in series. The control end Con of the plurality of capacitor branches connected in parallel is connected with the processor. In this case, the processor may connect in parallel all or part of the capacitors C1-C5 between the input end In and the output end Out by controlling each switch of the controller switches K(K1-K5) to turn off or on, thereby adjusting the resonant capacitor.

In another example, the resonant capacitor in the receiver may also be a mechanically adjustable capacitor. The mechanically adjustable capacitor may be adjusted by controlling a drive apparatus, thereby adjusting the resonant capacitor.

Figure 5:
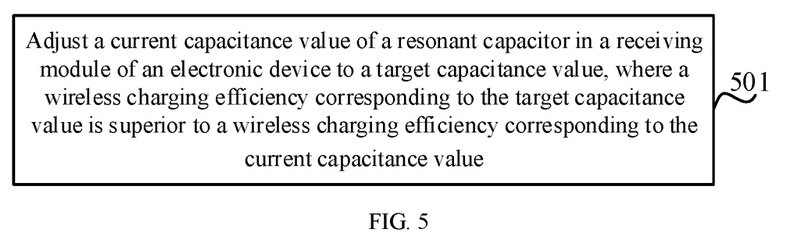
FIG. 5 is a flowchart illustrating a method of improving a wireless charging efficiency according to an example of the present disclosure.

In the case of the above receiver, the examples of the present disclosure provide a method of improving a wireless charging efficiency. The method may be applied to a processor of an electronic device. FIG. 5 is a flowchart illustrating a method of improving a wireless charging efficiency according to an example of the present disclosure. As shown in FIG. 5, the method of improving a wireless charging efficiency may include step 501.

At step 501, a current capacitance value of a resonant capacitor in a receiver of the electronic device is adjusted to a target capacitance value, where a wireless charging efficiency corresponding to the target capacitance value is superior to a wireless charging efficiency corresponding to the current capacitance value.

In the example, the processor of the electronic device may determine the target capacitance value of the resonant capacitor in the receiver of the electronic device in the following manners.

Figure 6:
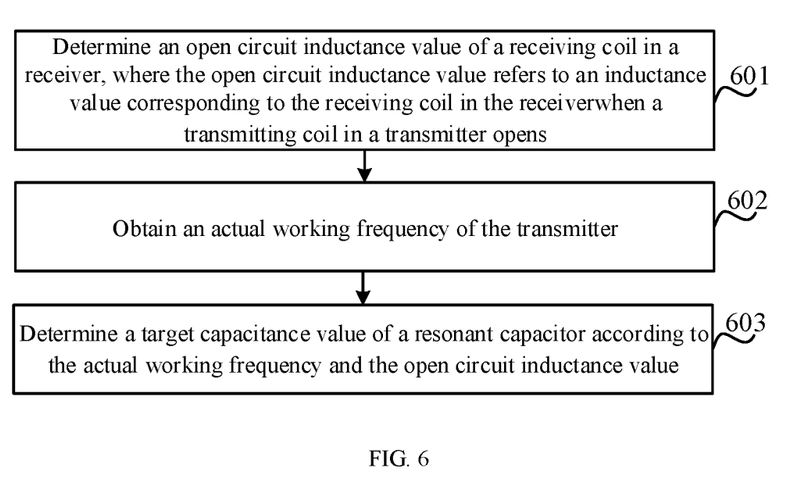
FIG. 6 is a flowchart of obtaining a target capacitance value according to an example of the present disclosure.

In the first manner, as shown in FIG. 6, the processor firstly calculates an open circuit inductance value of the receiving coil $L_{22}$ (corresponding to step 601). With continuous reference to FIG. 2, the open circuit inductance value is an inductance value corresponding to the receiving coil $L_{22}$ in the receiver when the transmitting coil $L_{11}$ is in an open-circuit state. In other words, the open circuit inductance value is an inductance value corresponding to the receiving coil $L_{22}$ in the receiver when the current $i_1$ is zero.

Figure 7A:
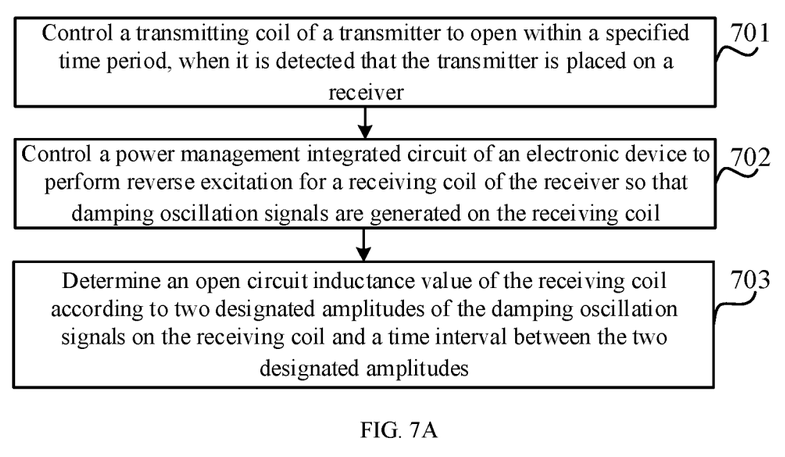
FIG. 7A is a flowchart of obtaining an open circuit inductance value according to an example of the present disclosure.
Figure 7B:
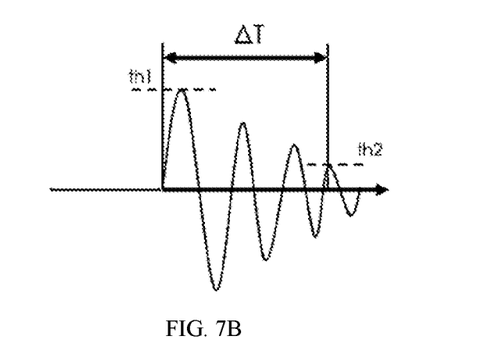
FIG. 7B is a schematic diagram illustrating a signal of damping oscillation according to an example of the present disclosure.

As shown in FIG. 7A, the open circuit inductance value may be calculated as follows:

After the transmitter is placed on the receiver, the processor may control the transmitting coil to open within a specified time period (corresponding to step 701), or the transmitter and the receiver may negotiate to enable the transmitting coil in the transmitter to maintain open within a specified time period. Afterwards, the processor may control a power management integrated circuit (PMIC) of the electronic device to perform reverse excitation for the receiving coil. In this way, damping oscillation signals are generated on the receiving coil (corresponding to step 702). The damping oscillation signals are sinusoidal periodic signals. Afterwards, the processor may detect amplitudes of the damping oscillation signals generated on the receiving coil, select two designated amplitudes and then calculate the open circuit inductance value L of the receiving coil $L_{22}$ according to a time interval $\Delta t$ between the two designated amplitudes (corresponding to step 703). The two designated amplitudes may be two preset amplitudes th0 and th1, which is specifically indicated in FIG. 7B. Further, because position that the transmitter is placed on the receiver is different each time, calculation result of the open circuit inductance value L is different each time.

With continuous reference to FIG. 6, the processor may obtain the actual working frequency of the transmitter (corresponding to step 602). It is noted that the transmitter may adjust its actual working frequency in real time according to an output voltage of the transmitting coil. After the actual working frequency is determined, the processor may interact with the transmitter to obtain the actual working frequency of the transmitter. In addition, the sequence of performing steps 601 and 602 is not limited herein.

With continuous reference to FIG. 6, in combination with the formula (2), the processor may determine the target capacitance value of the resonant capacitor according to the actual working frequency of the transmitter and the open circuit inductance value of the receiving coil (corresponding to step 603).

Figure 8:
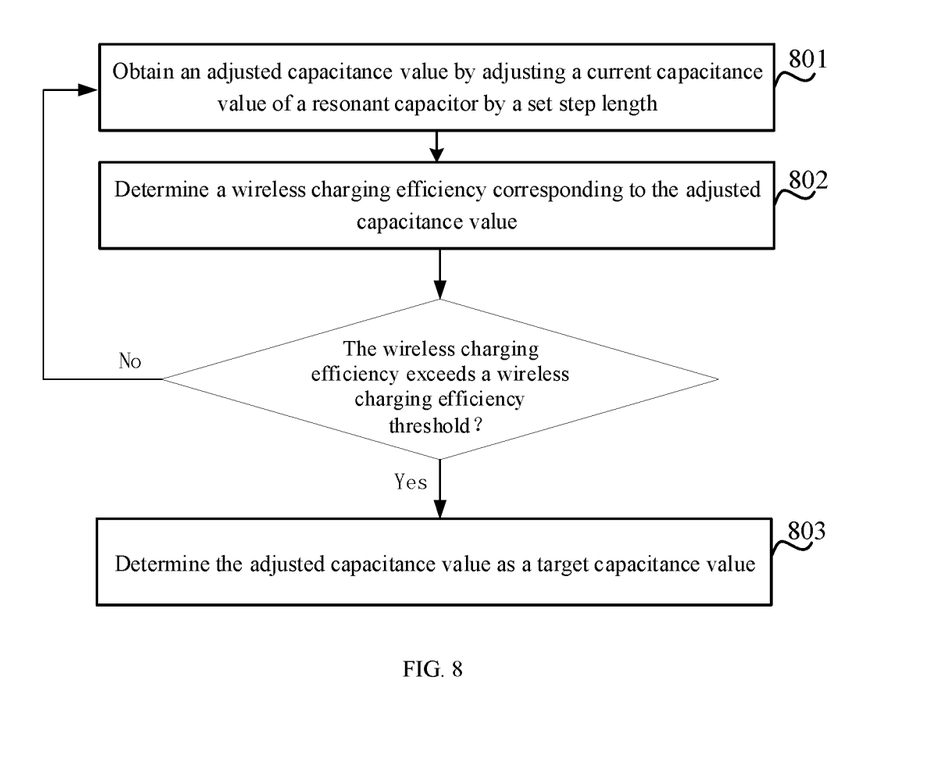
FIG. 8 is another flowchart of obtaining a target capacitance value according to an example of the present disclosure.

In the second manner, as shown in FIG. 8, the processor may adjust the current capacitance value of the resonant capacitor by a preset step length to obtain an adjusted capacitance value (corresponding to step 801). For example, the resonant capacitor may be an adjustable capacitor. In this case, the processor may increase a voltage by 0.1V each time on the basis of a current control voltage, so that the current capacitance value of the resonant capacitor becomes larger. For another example, the resonant capacitor is a capacitor formed by connecting a plurality of capacitor branches in parallel. In this case, the processor may turn off one controllable switch sequentially, so that the corresponding capacitor branch is removed from the resonant capacitor or the processor may turn on one controllable switch sequentially, so that the corresponding capacitor branch is incorporated into the resonant capacitor to change the current capacitance value of the resonant capacitor. Then, the processor may determine a wireless charging efficiency corresponding to the adjusted capacitance value (corresponding to step 802). Afterwards, the processor may determine whether the wireless charging efficiency exceeds a wireless charging efficiency threshold. If yes, it is determined the adjusted capacitance value is the target capacitance value (corresponding to step 803). If not, the processor continues to perform steps 801-803 until the wireless charging efficiency exceeds the wireless charging efficiency threshold.

Figure 9:
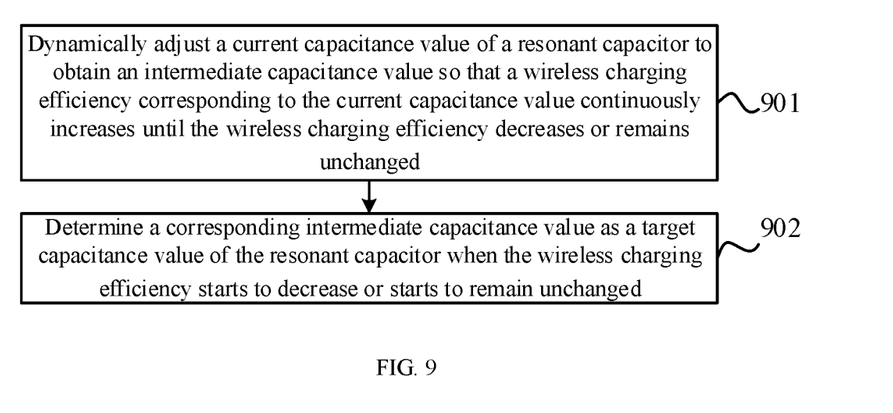
FIG. 9 is yet another flowchart of obtaining a target capacitance value according to an example of the present disclosure.

In the third manner, as shown in FIG. 9, the processor may dynamically adjust the current capacitance value of the resonant capacitor so that the wireless charging efficiency of the receiver (the wireless charging efficiency corresponding to the current capacitance value) continuously increases until the wireless charging efficiency decreases or remains unchanged (corresponding to step 901). Afterwards, the processor determines a corresponding current capacitance value as the target capacitance value of the resonant capacitor when the wireless charging efficiency starts to decrease or starts to remain unchanged (corresponding to step 902). In other words, the processor may obtain a corresponding wireless charging efficiency curve by adjusting the capacitance value of the resonant capacitor from the minimum to the maximum, and determine the capacitance value corresponding to an inflexion point on the wireless charging efficiency curve as the target capacitance value of the resonant capacitor.

In the example, the processor or a controller may control the resonant capacitor to adjust from the current capacitance value to the target capacitance value, so that the wireless charging efficiency of the receiver exceeds the wireless charging efficiency threshold and even is the optimal wireless charging efficiency.

In an example, the resonant capacitor in the receiver is of a fixed value of 500 nF. Results shown in Table 1 may be obtained by adjusting the capacitance value of the resonant capacitor by the method of improving a wireless charging efficiency according to the examples of the present disclosure.

TABLE 1

| Resonant capacitor of receiver | output voltage of receiver | output current of receiver | output power of receiver | input power of transmitter | wireless charging efficiency |
| --- | --- | --- | --- | --- | --- |
| 500 nF | 19.86 V | 1 A | 19.86 W | 24 W | 82.8% |
| 203 nF | 20.41 V | 1 A | 20.41 W | 23.97 W | 85.2% |

In the wireless charging process, analysis shows that when the resonant capacitor of the receiver is 203 nF, the efficiency is the highest. Compared with the resonant capacitor of 500 nF, the wireless charging efficiency is increased by 2.8%.

In the examples of the present disclosure, the target capacitance value of the resonant capacitor in the receiver of the electronic device is determined to which the corresponding wireless charging efficiency is superior to the wireless charging efficiency corresponding to the current capacitance value. Afterwards, the resonant capacitor is controlled to adjust from the current capacitance value to the target capacitance value. In the examples, by adjusting the current capacitance value of the resonant capacitor to the target capacitance value, the resonant frequency of the receiver is allowed to be closer to the actual working frequency of the transmitter, which helps improve the wireless charging efficiency and reduce time required for charging the electronic device.

Figure 10:
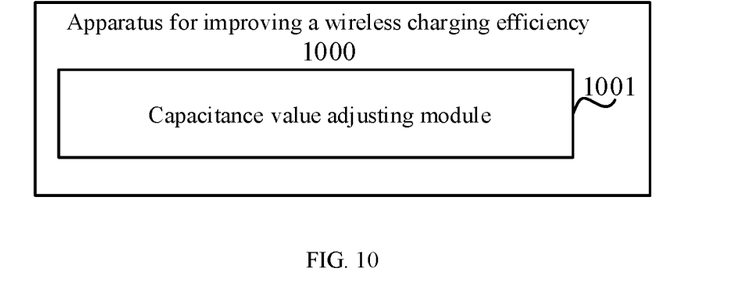
FIG. 10 is a block diagram illustrating an apparatus for improving a wireless charging efficiency according to an example of the present disclosure.

Based on the method of improving a wireless charging efficiency according to some examples of the present disclosure, the examples of the present disclosure further provide an apparatus for improving a wireless charging efficiency. The apparatus may be applied to an electronic device supporting wireless charge. FIG. 10 is a block diagram illustrating an apparatus for improving a wireless charging efficiency according to an example of the present disclosure. As shown in FIG. 10, the apparatus 1000 for improving a wireless charging efficiency includes the following modules and units.

A capacitance value adjusting module 1001 is configured to adjust a current capacitance value of a resonant capacitor in a receiver of the electronic device to a target capacitance value, where a wireless charging efficiency corresponding to the target capacitance value is superior to a wireless charging efficiency corresponding to the current capacitance value.

Figure 11:
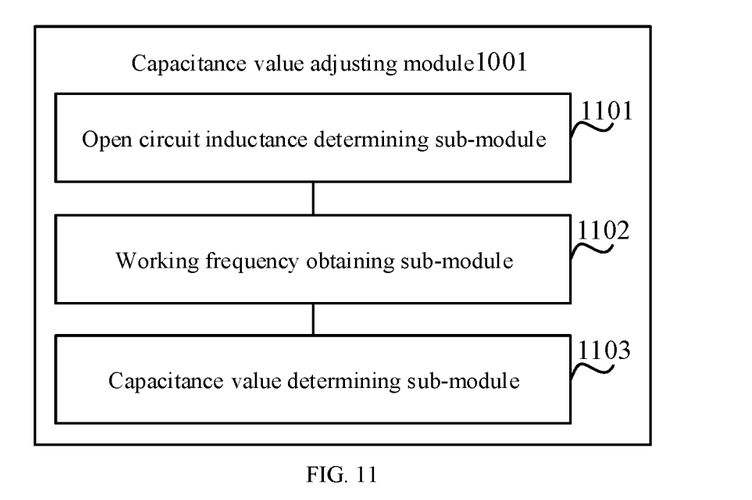
FIG. 11 illustrates an example for the capacitance value adjusting module.

As shown in FIG. 11, based on the apparatus 1000 for improving a wireless charging efficiency shown in FIG. 10, the capacitance value adjusting module 1001 includes:

an open circuit inductance determining sub-module 1101, configured to determine an open circuit inductance value in the receiver, where the open circuit inductance value is an inductance value corresponding to a receiving coil in the receiver when a transmitting coil in a transmitter of a wireless charging device is in an open-circuit state;

a working frequency obtaining sub-module 1102, configured to obtain an actual working frequency of the transmitter; and a capacitance value determining sub-module 1103, configured to determine the target capacitance value of the resonant capacitor according to the actual working frequency and the open circuit inductance value.

Figure 12:
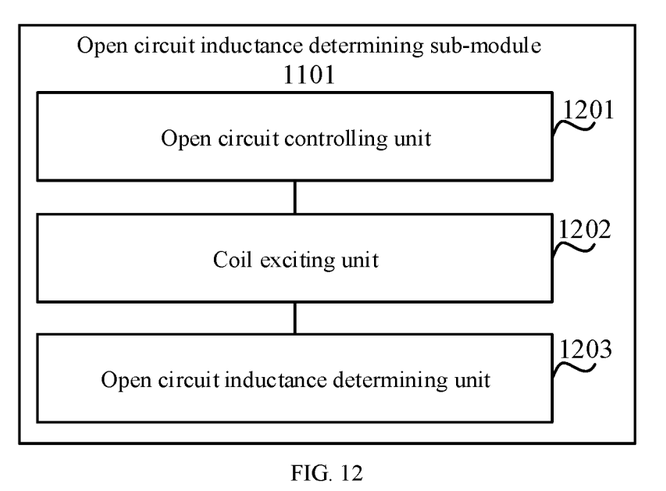
FIG. 12 illustrates an example for the open circuit inductance determining sub-module.

As shown in FIG. 12, based on the apparatus 1000 for improving a wireless charging efficiency shown in FIG. 11, the open circuit inductance determining sub-module 1101 includes:

an open circuit controlling unit 1201, configured to control the transmitting coil to open within a specified time period when it is detected the transmitter is placed on the receiver;

a coil exciting unit 1202, configured to control a Power Management Integrated Circuit of the electronic device to perform reverse excitation for the receiving coil, so that damping oscillation signals are generated on the receiving coil; and an open circuit inductance determining unit 1203, configured to determine the open circuit inductance value of the receiving coil according to two designated amplitudes of the damping oscillation signals on the receiving coil and a time interval between the two designated amplitudes.

Figure 13:
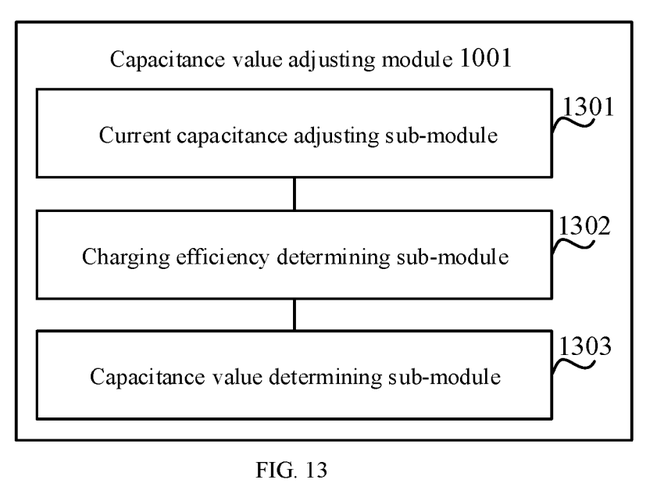
FIG. 13 illustrates an example for the capacitance value adjusting module.

As shown in FIG. 13, based on the apparatus 1000 for improving a wireless charging efficiency shown in FIG. 10, the capacitance value adjusting module 1001 further includes:

a current capacitance adjusting sub-module 1301, configured to obtain an adjusted capacitance value by adjusting the current capacitance value of the resonant capacitor by a preset step length sequentially;

a charging efficiency determining sub-module 1302, configured to determine a wireless charging efficiency corresponding to the adjusted capacitance value; and a capacitance value determining sub-module 1303, configured to determine the adjusted capacitance value as a target capacitance value until the wireless charging efficiency exceeds a preset wireless charging efficiency threshold.

Figure 14:
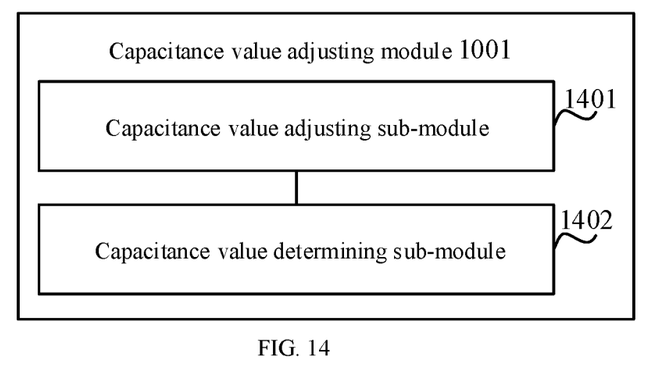
FIG. 14 illustrates an example for the capacitance value adjusting module.

As shown in FIG. 14, based on the apparatus 1000 for improving a wireless charging efficiency shown in FIG. 10, the capacitance value adjusting module 1001 further includes:

a capacitance value adjusting sub-module 1401, configured to dynamically adjust the current capacitance value of the resonant capacitor to obtain intermediate capacitance values, so that the corresponding wireless charging efficiency continuously increases until the wireless charging efficiency decreases or remains unchanged;

a capacitance value determining sub-module 1402, configured to determine a corresponding intermediate capacitance value as the target capacitance value of the resonant capacitor until the wireless charging efficiency starts to decrease or starts to remain unchanged.

It is understood that the apparatus for improving a wireless charging efficiency according to the examples of the present disclosure corresponds to the above method of improving a wireless charging efficiency. A reference may be made to contents of different examples of the method for specific contents of the apparatus, which will not be repeated herein.

Figure 15:
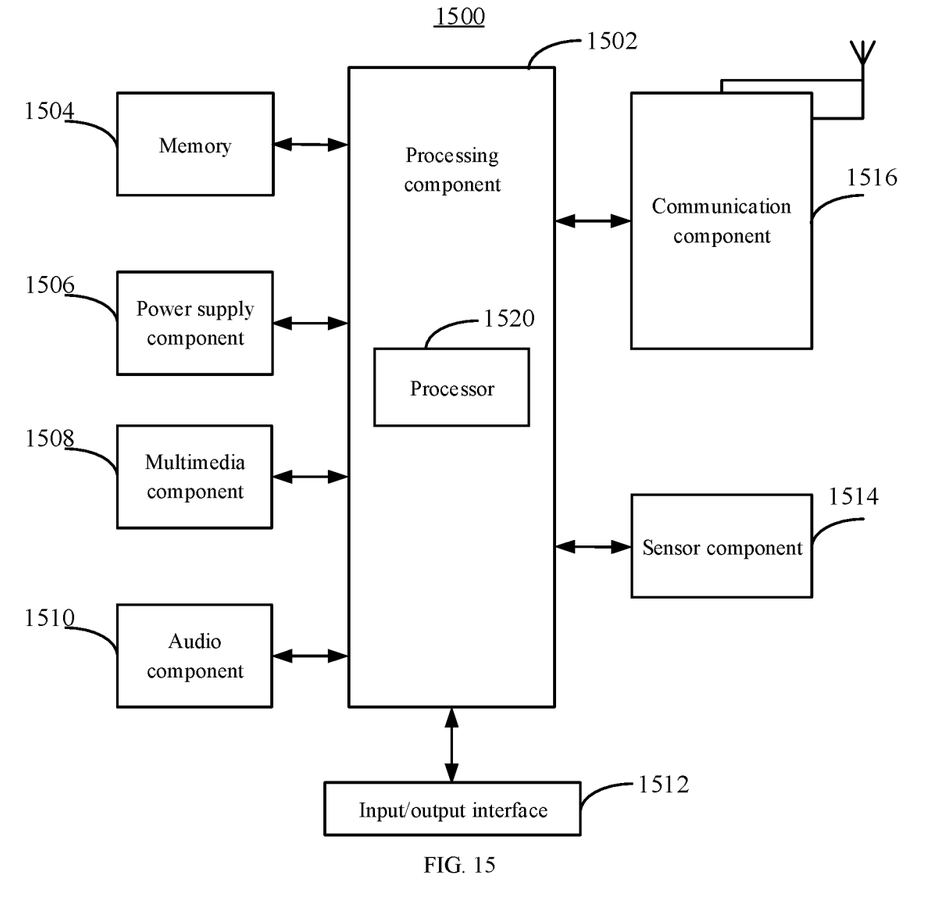
FIG. 15 is a block diagram illustrating an electronic device according to an example of the present disclosure.

FIG. 15 is a block diagram illustrating an electronic device 1500 according to an example of the present disclosure. For example, the electronic device 1500 may be a mobile phone, a tablet computer, an electronic book reader, a multi-media player, a wearable device, a vehicle-mounted terminal and so on.

As shown in FIG. 15, the electronic device 1500 may include one or more of the following components: a processing component 1502, a memory 1504, a power supply component 1506, a multimedia component 1508, an audio component 1510, an input/output (I/O) interface 1512, a sensor component 1514 and a communication component 1516.

The processing component 1502 usually controls overall operations of the electronic device 1500, such as operations relating to display, a telephone call, data communication, camera operations, and recording operations. The processing component 1502 may include one or more processors 1520 for executing instructions to complete all or a part of the steps of the above method. In addition, the processing component 1502 may include one or more modules to facilitate the interaction between the processing component 1502 and other components. For example, the processing component 1502 may include a multimedia module to facilitate the interaction between the multimedia component 1508 and the processing component 1502. For another example, the processing component 1502 may read executable instructions from a memory to implement steps of the method of improving a wireless charging efficiency according to the above examples.

The memory 1504 is configured to store different types of data to support operations at the electronic device 1500. Examples of such data include instructions, contact data, phonebook data, messages, pictures, videos, and so on for any application or method that operates on the electronic device 1500. The memory 1504 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1506 provides power for different components of the electronic device 1500. The power supply component 1506 may include a power management system, one or more power supplies, and other components associated with generating, managing and distributing power for the electronic device 1500. The power supply component 1506 may further include a receiver used for wireless charge. A resonant capacitor in the receiver may be an adjustable capacitor shown in FIG. 3 or 4.

The multimedia component 1508 includes a screen providing an output interface between the electronic device 1500 and a user. In some examples, the multimedia component 1508 may include a front-facing camera and/or a rear camera. When the electronic device 1500 is in an operating mode, such as in a shooting mode or a video mode, the front-facing camera and/or the rear camera may receive external multimedia data. Each of the front-facing camera and the rear camera may be a fixed optical lens system or may be capable of focal length and optical zoom.

The audio component 1510 is configured to output and/or input an audio signal. For example, the audio component 1510 includes a microphone (MIC). When the electronic device 1500 is in an operating mode, for example, in a call mode, a recording mode or a voice recognition mode, the microphone is configured to receive an external audio signal. The received audio signal may be further stored in the memory 1504 or sent via the communication component 1516. In some examples, the audio component 1510 further includes a speaker for outputting an audio signal.

The I/O interface 1512 provides an interface between the processing component 1502 and a peripheral interface module. The peripheral interface module may be a keyboard, a click wheel, a button, or the like. These buttons may include but not limited to, a home button, a volume button, a start button and a lock button.

The sensor component 1514 includes one or more sensors for providing a state assessment in different aspects for the electronic device 1500. For example, the sensor component 1514 may detect the on/off state of the electronic device 1500, and relative locations of components, for example, the components are a display and a keypad of the electronic device 1500. The sensor component 1514 may also detect a position change of the electronic device 1500 or a component of the electronic device 1500, presence or absence of contact of a user with the electronic device 1500, an orientation or acceleration/deceleration of the electronic device 1500 and a temperature change of the electronic device 1500. The sensor component 1514 may include a proximity sensor configured to detect presence of a nearby object without any physical contact. The sensor component 1514 may further include an optical sensor, such as a CMOS or CCD image sensor used in an imaging application. In some examples, the sensor component 1514 may further include an acceleration sensor, a gyroscope sensor, a magnetic sensor, a pressure sensor, or a temperature sensor.

The communication component 1516 is configured to facilitate wired or wireless communication between the electronic device 1500 and other devices. The electronic device 1500 may access a wireless network based on a communication standard, such as WIFI, 2G or 3G, 4G, 5G, or a combination thereof. In an example, the communication component 1516 receives a broadcast signal or broadcast-related information from an external broadcast management system via a broadcast channel. In an example, the communication component 1516 may further include a Near Field Communication (NFC) module to facilitate short-range communications. For example, the NFC module may be implemented based on Radio Frequency Identification (RFID) technology, Infrared Data Association (IrDA) technology, Ultra Wide Band (UWB) technology, Bluetooth (BT) technology and other technology.

In an example, the electronic device 1500 may be implemented by one or more of Application-Specific Integrated Circuits (ASIC), Digital Signal Processors (DSP), Digital Signal Processing Devices (DSPD), Programmable Logical Devices (PLD), Field Programmable Gate Arrays (FPGA), controllers, microcontrollers, microprocessors or other electronic elements to perform the above method.

In an example, there is further provided a non-transitory machine readable storage medium including instructions, for example, the memory 1504 including instructions. The above instructions may be executed by the processor 1520 of the electronic device 1500 to complete the above method. For example, the non-transitory computer readable storage medium may be a Read-Only Memory (ROM), a Random Access Memory (RAM), a CD-ROM, a magnetic tape, a floppy disk, and optical data storage device and so on.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

What is claimed is:

1. A method of improving a wireless charging efficiency, the method being applicable to an electronic device supporting wireless charge, and comprising:
    adjusting a current capacitance value of a resonant capacitor in a receiver of the electronic device to a target capacitance value, wherein the target capacitance value is determined according to an actual working frequency of a transmitter of a wireless charging device for charging the electronic device and an open circuit inductance value of the receiver;
    when it is detected that the transmitter is placed on the receiver, controlling a transmitting coil of the transmitter in an open-circuit state within a specified time period, determining the open circuit inductance value in the receiver, wherein the open circuit inductance value is an inductance value corresponding to a receiving coil in the receiver when the transmitting coil is in the open-circuit state;
    when it is detected that the transmitter is placed on the receiver, obtaining the actual working frequency of the transmitter; and
    determining the target capacitance value of the resonant capacitor according to the actual working frequency and the open circuit inductance value.

2. The method according to claim 1, wherein determining the open circuit inductance value in the receiver comprises:
    controlling a power management integrated circuit of the electronic device to perform reverse excitation for the receiving coil so that damping oscillation signals are generated on the receiving coil; and
    determining the open circuit inductance value according to two amplitudes of the damping oscillation signals on the receiving coil and a time interval between the two amplitudes.

3. The method according to claim 1, wherein adjusting the current capacitance value of the resonant capacitor in the receiver of the electronic device to the target capacitance value comprises:

obtaining an adjusted capacitance value by adjusting the current capacitance value of the resonant capacitor by a set step length sequentially;

determining a wireless charging efficiency corresponding to the adjusted capacitance value; and in response to determining that the wireless charging efficiency exceeds a preset wireless charging efficiency threshold, determining the adjusted capacitance value as the target capacitance value.

4. The method according to claim 1, wherein adjusting the current capacitance value of the resonant capacitor in the receiver of the electronic device to the target capacitance value comprises:

dynamically adjusting the current capacitance value of the resonant capacitor to obtain intermediate capacitance values so that the wireless charging efficiency continuously increases until the wireless charging efficiency decreases or remains unchanged; and determining a corresponding intermediate capacitance value as the target capacitance value of the resonant capacitor when the wireless charging efficiency starts to decrease or starts to remain unchanged.

5. An electronic device, comprising:

a receiver for wireless charge where a resonant capacitor is disposed in the receiver and a receiving coil is disposed in the receiver and connected with the resonant capacitor;

one or more processors connected with the resonant capacitor; and a memory storing executable instructions;

wherein when reading executable instructions from the memory, the processors are caused to adjust a current capacitance value of the resonant capacitor to a target capacitance value, and wherein the target capacitance value is determined according to an actual working frequency of a transmitter of a wireless charging device for charging the electronic device and an open circuit inductance value of the receiver;

when it is detected that the transmitter is placed on the receiver, control a transmitting coil of the transmitter in an open-circuit state within a specified time period, determine the open circuit inductance value in the receiver, wherein the open circuit inductance value is an inductance value corresponding to a receiving coil in the receiver when the transmitting coil is in the open-circuit state;

when it is detected that the transmitter is placed on the receiver, obtain the actual working frequency of the transmitter; and determine the target capacitance value of the resonant capacitor according to the actual working frequency and the open circuit inductance value.

6. The electronic device according to claim 5, wherein when determining the open circuit inductance value in the receiver, the processor is further caused to:

control a power management integrated circuit of the electronic device to perform reverse excitation for the receiving coil so that damping oscillation signals are generated on the receiving coil; and determine the open circuit inductance value according to two amplitudes of the damping oscillation signals on the receiving coil and a time interval between the two amplitudes.

7. The electronic device according to claim 5, wherein when adjusting the current capacitance value of the resonant capacitor to the target capacitance value, the processor is further caused to:

obtain an adjusted capacitance value by adjusting the current capacitance value of the resonant capacitor by a set step length sequentially;

determine a wireless charging efficiency corresponding to the adjusted capacitance value; and in response to determining that the wireless charging efficiency exceeds a preset wireless charging efficiency threshold, determine the adjusted capacitance value as the target capacitance value.

8. The electronic device according to claim 5, wherein when adjusting the current capacitance value of the resonant capacitor to the target capacitance value, the processor is further caused to:

dynamically adjust the current capacitance value of the resonant capacitor to obtain intermediate capacitance values, so that the wireless charging efficiency continuously increases until the wireless charging efficiency decreases or remains unchanged; and determine a corresponding intermediate capacitance value as the target capacitance value of the resonant capacitor when the wireless charging efficiency starts to decrease or starts to remain unchanged.

9. The electronic device according to claim 5, wherein the resonant capacitor comprises a variable capacitor.

10. The electronic device according to claim 5, wherein, the resonant capacitor comprises a plurality of capacitor branches connected in parallel;

each of the capacitor branches comprises a capacitor and a controllable switch connected in series; and the controllable switch is connected with the processors.

11. A machine readable storage medium storing machine executable instructions, wherein the instructions are executed by a processor to:

adjust a current capacitance value of a resonant capacitor in a receiver of an electronic device to a target capacitance value, wherein the target capacitance value is determined according to an actual working frequency of a transmitter of a wireless charging device for charging the electronic device and an open circuit inductance value of the receiver;

when it is detected that the transmitter is placed on the receiver, control a transmitting coil of the transmitter in an open-circuit state within a specified time period, determine the open circuit inductance value in the receiver, wherein the open circuit inductance value is an inductance value corresponding to a receiving coil in the receiver when the transmitting coil is in the open-circuit state;

when it is detected that the transmitter is placed on the receiver, obtain the actual working frequency of the transmitter; and determine the target capacitance value of the resonant capacitor according to the actual working frequency and the open circuit inductance value.

12. The storage medium according to claim 11, wherein when determining the open circuit inductance value in the receiver, the processor is further caused to:

control a power management integrated circuit of the electronic device to perform reverse excitation for the receiving coil so that damping oscillation signals are generated on the receiving coil; and determine the open circuit inductance value according to two amplitudes of the damping oscillation signals on the receiving coil and a time interval between the two amplitudes.

13. The storage medium according to claim 11, wherein when adjusting the current capacitance value of the resonant capacitor to the target capacitance value, the processor is further caused to:
- obtain an adjusted capacitance value by adjusting the current capacitance value of the resonant capacitor by a set step length sequentially;
- determine a wireless charging efficiency corresponding to the adjusted capacitance value; and
- in response to determining that the wireless charging efficiency exceeds a preset wireless charging efficiency threshold, determine the adjusted capacitance value as the target capacitance value.

14. The storage medium according to claim 11, wherein when adjusting the current capacitance value of the resonant capacitor to the target capacitance value, the processor is further caused to:
- dynamically adjust the current capacitance value of the resonant capacitor to obtain intermediate capacitance values, so that the wireless charging efficiency continuously increases until the wireless charging efficiency decreases or remains unchanged; and
- determine a corresponding intermediate capacitance value as the target capacitance value of the resonant capacitor when the wireless charging efficiency starts to decrease or starts to remain unchanged.

* * * * *